United States Patent [19]
Fleischer, III et al.

[11] Patent Number: 5,920,618
[45] Date of Patent: Jul. 6, 1999

[54] APPARATUS AND METHOD FOR MANAGING TELEPHONY-BASED SERVICES

[75] Inventors: Harold C. Fleischer, III, St. Louis, Mo.; William Plunkett, Apex, N.C.

[73] Assignee: SBC Technology Resources, Inc., Austin, Tex.

[21] Appl. No.: 08/758,518

[22] Filed: Nov. 29, 1996

[51] Int. Cl.⁶ ............... H04M 3/42; H04M 7/00; H04Q 11/04

[52] U.S. Cl. .............. 379/207; 370/259; 379/201; 379/230

[58] Field of Search ................... 370/389, 259; 379/201, 207, 219, 220, 230

[56] References Cited

U.S. PATENT DOCUMENTS

| | | | |
|---|---|---|---|
| 5,337,351 | 8/1994 | Manabe et al. | 379/201 |
| 5,404,396 | 4/1995 | Brennan | 379/201 |
| 5,438,568 | 8/1995 | Weisser, Jr. | 370/389 |
| 5,448,631 | 9/1995 | Cain | 379/207 X |
| 5,657,451 | 8/1997 | Khello | 379/201 |
| 5,796,950 | 8/1998 | Sips et al. | 379/201 X |
| 5,802,159 | 9/1998 | Smolentzov et al. | 379/201 |
| 5,822,419 | 10/1998 | Enstone et al. | 379/201 X |

OTHER PUBLICATIONS

Advanced Intelligent Network (AIN) 0.1 Switching Systems Generic Requirements (Bellcore TR–NWT 001284), Issue 1, Aug. 1992.

Advanced Intelligent Network (AIN) 0.1 Switch–Service Control Point (SCP) Application Protocol Interface Generic Requirements (Bellcore TR–NWT–001285), Issue 1, Aug. 1992.

Primary Examiner—Harry S. Hong
Attorney, Agent, or Firm—Greenblum & Bernstein P.L.C.

[57] ABSTRACT

An apparatus and method are provided for managing the operation and interaction of one or more telephony-based services (such as AIN-based services). A feature interaction manager is utilized performing a predetermined decision process to determine which one of a customer's AIN services will be executed, and in what order the customer's AIN services will be initiated. The feature interaction manager may reside at a Service Control Point and may be executed whenever an AIN trigger is encountered at a switch based on a call request to establish communication with the customer. Once the last of the customer's services have completed execution, the feature interaction manager returns control to the switch encountering the AIN trigger for appropriate handling or routing of the call request.

22 Claims, 8 Drawing Sheets

APPARATUS AND METHOD FOR MANAGING TELEPHONY-BASED SERVICES

BACKGROUND OF THE INVENTION

1. Field of the Invention

The present invention generally relates to the field of telecommunications and to an apparatus and method for managing telephony-based services. More particularly, the present invention relates to an intelligent or advanced application, such as an Advanced Intelligent Network (AIN) application, for managing the interaction and operation of a plurality of telephony-based services for subscribers.

2. Acronyms

The written description provided herein contains acronyms which refer to various communication services and system components. Although known, use of several of these acronyms is not strictly standardized in the art. For purposes of the written description herein, acronyms will be defined as follows:

10D—10 Digit Trigger
AIN—Advanced Intelligent Network
CCIS—Common Channel Interoffice Signaling
CCS—Common Channel Signaling
CO—Central Office
CPR—Call Processing Record
CPN—Calling Party Number
DID—Direct Inward Dialing
DLN—Dialed Line Number
DRS—Data and Reports System
EO—End Office
FIM—Feature Interaction Manager
ISCP—Integrated Service Control Point
ISUP—ISDN Users Part
LATA—Local Access and Transport Area
MF—Multi-Frequency
NANP—North American Numbering Plan
NPA—Numbering Plan Area
NXX—Central Office Code
PRI—Primary Rate Interface
PSTN—Public Switched Telephone Network
SCE—Service Creation Environment
SCP—Service Control Point
SMS—Service Management System
SS7—Signaling System 7
SSP—Service Switching Point
STP—Signaling Transfer Point
TAT—Termination Attempt Trigger
TCAP—Transaction Capabilities Applications Part
TG—Trunk Group
TN—Telephone Number

3. Background Information

In recent years, a number of new telephone service features have been provided by an Advanced Intelligent Network (AIN). The AIN evolved out of a need to increase the capabilities of the telephone network architecture to meet the growing needs of telephone customers or users. The AIN architecture generally comprises two networks, a data messaging network and a trunked communications network. The trunked communications network handles voice and data communications between dispersed network locations, whereas the data messaging network is provided for controlling operations of the trunked communications network.

Figure 7:
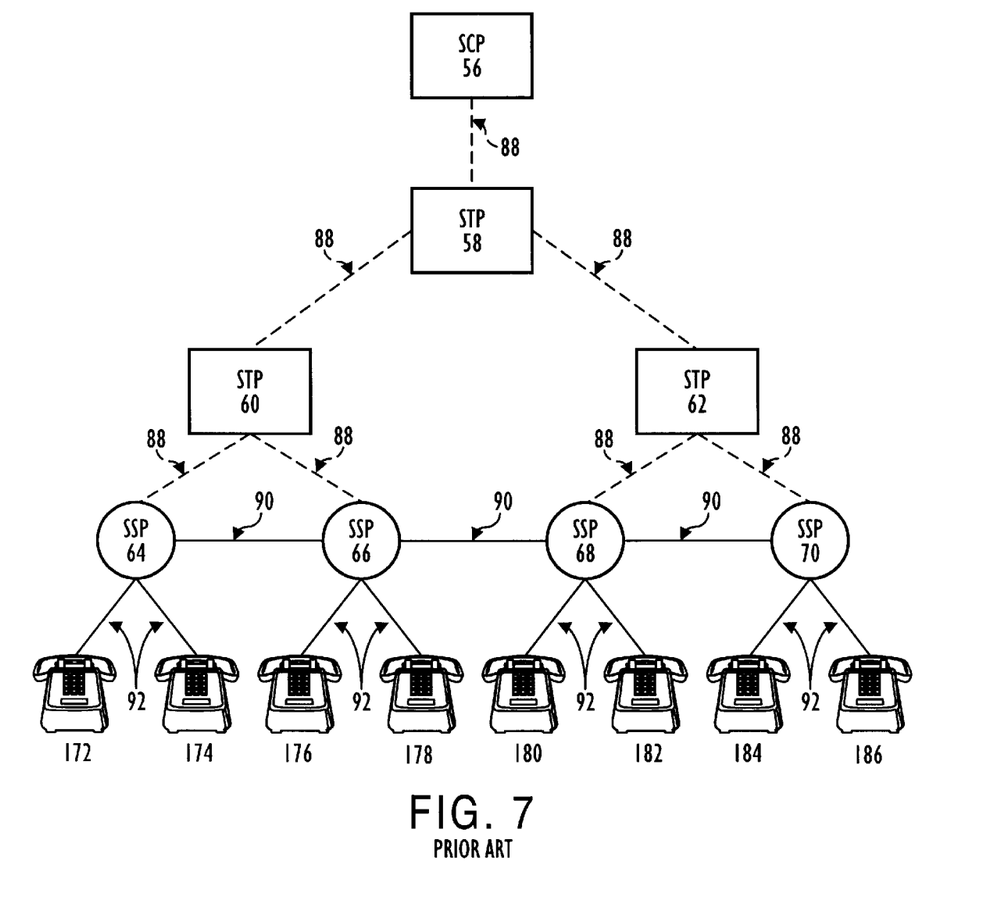
FIG. 7 illustrates an exemplary block diagram of the basic components of a conventional, Advanced Intelligent Network (AIN) system.

An illustration of the basic components of an AIN architecture is shown in FIG. 7. As shown in FIG. 7, Service Switching Points (SSPs) 64–70 are provided for sending and receiving data messages from a Service Control Point (SCP) 56 via Signaling Transfer Points (STPs) 58–62. The data messages are communicated to and from the SSPs 64–70 and the SCP 56 along a Common Channel Signaling (CCS) network 88. Each SSP 64–70 routes telephone calls between a plurality of dispersed network stations 172–186. For example, SSPs 64–70 may route a telephone call between a calling station (e.g., station 172) and a called station (e.g., station 184) through trunks 90 and customer lines 92 (e.g., telephone lines). Stations 172–186 may comprise various customer or terminal equipment, such as a telephone unit (wired, cellular or mobile), a facsimile machine, and/or a modem attached to a personal computer.

More information regarding AIN may be found in various publications. See, for example, Berman, Roger K., and Brewster, John H., "Perspectives on the AIN Architecture," IEEE Communications Magazine, February 1992, pp. 27–32, the disclosure of which is expressly incorporated herein by reference in its entirety.

A number of services or features provided by the prior AIN or AIN-type intelligent networks relate to specialized call processing or recording of incoming calls and call traffic. For example, U.S. Pat. Nos. 4,611,094 and 4,611,096, both to ASMUTH et al., disclose a system for providing custom incoming telephone call processing services to a subscriber operating at geographically diverse locations. A subscriber program stored in a central database is accessed to provide instructions to the SSPs to complete incoming calls to one of the subscriber locations in accordance with special services defined by the subscriber. The subscriber program controls the Action Control Points (ACPs) to string together the desired call processing capabilities to process each call. Specified parameters stored in the program, such as time of day, caller location and data inputted by the caller, determine the final destination to which each call should be completed.

Further, U.S. Pat. No. 4,788,718, to McNABB, teaches centralized recording of call traffic information. The system provides a data gathering and recording function to the centralized database which stores the subscriber's call routing program. The subscriber's call routing program performs several functions, including presenting various announcements to callers, prompting callers for inputting information digits and collecting the resulting information digits, routing the call to a number provided by the subscriber, and performing final call dispositions other than routing to the telephone number provided by the subscriber. Processing of the call traffic information dynamically changes the subscriber's call routing program to reduce the number of blocked calls to the subscriber's telephone numbers.

U.S. Pat. No. 4,899,373, to LEE et al., discloses a system to provide telephone services to a subscriber on a personal basis when the subscriber is away from his or her home base or office. A nationally accessible database, via the CCIS, stores the subscriber's feature data in association with a personal identification number (PIN). A subscriber wishing to use personalized features while away from a home base or office, dials a special code from a station connected to any exchange which has access to the database and enters a PIN. The station then provides telephone service to the subscriber based on the subscriber's personalized telephone service.

U.S. Pat. No. 5,247,571, to KAY et al., discloses an Area Wide Centrex system to provide specialized calling features to stations connected to a plurality of central offices. Each of the central office switching points connects to a number of local telephone lines. The features are extended to the local telephone lines by taking the programming intelligence out of the central offices and moving it to a database located in a central location, such as an SCP. Service features are controlled by the central database and are changed by reprogramming the service logic located at the central database. A variety of service features are provided including extension number dialing and call transfer across groups of lines connected to different exchanges.

U.S. Pat. No. 5,353,331, to EMERY et al., discloses an AIN system which connects to, and controls processing of, calls to a subscriber's wireless handset via a home base station or wireless communication network. In response to calls directed to the subscriber's wireless handset, the AIN determines where the handset is located using a central database and routes the call to that location. The incoming call can be routed directly to the handset, blocked, or routed to an alternate termination point. In response to calls from the handset, the central database provides instruction data to the land line network to extend a requested special service to the subscriber.

While prior AIN or AIN-type intelligent network applications have provided various call screening and processing features to customers and end users, such past attempts have not addressed the problems which may occur when a subscriber wishes to subscribe to multiple AIN aor AIN-type services. In particular, the prior art has not addressed the many issues associated with feature interaction and prioritization among a plurality of subscriber services. Unacceptable or improperly managed feature interaction and prioritization may create a situation where a calling party cannot complete a call to the called subscriber, thus creating frustration and confusion among calling parties. Still further, the prior art has not addressed nor managed service interaction where different or varying AIN releases and protocols, and different or varying triggers are implemented throughout the AIN network.

Such features would be highly desirable to subscribers of multiple AIN-related services, and would provide many advantages to end users and customers, such as providing customers with more service options and preventing misdirected or blocked calls.

OBJECTS OF THE PRESENT INVENTION

In view of the above, the present invention, through one or more of its various aspects and/or embodiments is thus presented to accomplish one or more objects and advantages, such as those noted below.

A general object of the present invention is to provide an apparatus and method for managing telephony-based services for subscribers. Another object of the invention is to provide an apparatus and method for combining a plurality of services in an advanced or intelligent network, such as an Advanced Intelligent Network (AIN).

Yet another object of the present invention is to provide AIN or AIN-type functionality to a feature interaction manager, which manages the interaction of a plurality of AIN services.

Yet a further object of the present invention is to provide an apparatus and method for managing AIN services which is compatible with many AIN protocols (including past and present AIN protocols), and which may be easily upgraded to include and adapt to future AIN protocols.

Still another object of the present invention is to provide a modular service logic framework that is easily adapted to future trigger types and AIN protocols.

Yet another object of the present invention is to provide an apparatus and method for managing feature interaction of services, which supports a plurality of AIN trigger types and AIN equipped switching service points.

SUMMARY OF THE PRESENT INVENTION

Accordingly, one aspect of the present invention is to provide a system for managing customer services within an advanced intelligent communications system, where the advanced intelligent communications system comprising a service control point and a two-way communications network interconnecting a plurality of service switching points. The two-way communications network selectively establishes communication between at least two of a plurality of geographically dispersed locations coupled to the service switching points. The system comprises a device for encountering, at one of the plurality of service switching points, a trigger in response to a request from a calling party to establish a communication connection with a service subscriber; a device for accessing the service control point in response to the trigger encountered at the one service switching point; and a device for managing, at the service control point, the operation of services of the service subscriber based on an operational status of each of the services and a predetermined prioritization of the services.

According to another aspect of the present invention, the feature interaction manager comprises a device for determining the operational status of each of the services, and a device for activating, based on the predetermined prioritization of the services, service logic for executing a service when the service is determined to have an active operational status.

According to yet another aspect of the present invention, the managing device comprises a feature interaction manager, the feature interaction manager comprising a plurality of feature interaction modules, each of the plurality of feature interaction modules operating and managing the services in accordance with one of a plurality of trigger types encountered at the service switching points.

According to a further aspect of the present invention, the trigger types may comprise, for example, at least a dialed line number (DLN) trigger type, a 10 digit (10D) trigger type, a terminating attempt trigger (TAT) type. Additional trigger types may be added.

According to another aspect of the present invention, the service control point further comprises a plurality of trigger call processing records (CPR) associated with the subscriber based on the same trigger template, each of the trigger CPRs including information regarding services of the subscriber.

According to another aspect of the present invention, the subscriber service information includes the operational status and activation dates of services, and trunking information.

According to yet another aspect of the present invention, each of the trigger CPRs are associated with a subscriber telephone number at the service control point. The trigger CPRs comprise trigger graphs associated with the trigger type set by the subscriber telephone number in the service control point, and the service control point may comprise a device for selecting one of the trigger CPRs based on a trigger type of the trigger encountered at the service switching point.

Accordingly, another aspect of the present invention is to provide a system for managing services within an advanced intelligent network (AIN) communications system, the AIN communications system comprising a service control point, and a two-way communications network interconnecting a plurality of service switching points, the two-way communications network selectively establishing communication between at least two of a plurality of geographically dispersed locations coupled to the service switching points The system comprises an AIN triggering device, located at one of the plurality of service switching points, that is triggered in response to a request from a calling party to establish a communication connection with a service customer; a query mechanism to send a query to the service control point in response to the trigger encountered at the service switching point; and a feature interaction manager, located at the service control point, adapted to control the operation of services of the service customer in accordance predetermined interaction criteria.

According to another aspect of the present invention, the predetermined interaction criteria comprises an operational status of each of the services and a predetermined prioritization of the services.

According to yet another aspect of the present invention, the feature interaction manager comprises a device for determining the operational status of each of the services, and a device for activating, based on the predetermined prioritization of the services, service logic for executing a service when the service is determined to have an active operational status.

According to a further aspect of the present invention, the feature interaction manager comprises a plurality of feature interaction modules, each of the plurality of feature interaction modules managing the services in accordance with one of a plurality of trigger types encountered at the service switching points.

According to a further aspect of the present invention, the trigger types may comprise, for example, at least a dialed line number (DLN) trigger type, a 10 digit (10D) trigger type, a terminating attempt trigger (TAT) type. Additional trigger types may be added.

According to yet another aspect of the present invention, the service control point further comprises a plurality of trigger call processing records (CPR) based on the same trigger template associated with each of a plurality of trigger types and the service customer, each of the trigger CPRs including information regarding services of the service customer.

According to a further aspect of the present invention, the services information includes the operational status and activation dates of services, and trunking information.

According to yet another aspect of the present invention, each of the trigger CPRs are associated with a subscriber telephone number at the service control point. The trigger CPRs comprise trigger graphs associated with the trigger type set by the subscriber telephone number in the service control point, and the service control point may comprise a device for selecting one of the trigger CPRs based on a trigger type of the trigger encountered at the service switching point. The trigger may also be originating, with the calling party number being associated with the trigger CPR rather than the called party number.

Accordingly, another aspect of the present invention is to provide a method of managing the interaction of customer services comprising the steps of encountering, at one of the plurality of service switching points, a trigger in response to a request from a calling party, or in response to a calling party telephone number, to establish a communication connection with a service subscriber; accessing the service control point in response to the trigger encountered at the one service switching point; and managing, at the service control point, the operation of services of the service subscriber based on an operational status of each of the services and a predetermined prioritization of the services.

According to another aspect of the present invention, is determining the operational status of each of the services; and activating, based on the predetermined prioritization of the services, service logic for executing a service when the service is determined to have an active operational status.

According to yet another aspect of the present invention, the system comprises a feature interaction manager, the feature interaction manager comprising a plurality of feature interaction modules, each of the plurality of feature interaction modules operating and managing the services in accordance with one of a plurality of trigger types encountered at the service switching points.

According to a further aspect of the present invention, the trigger types may comprise, for example, at least a dialed line number (DLN) trigger type, a 10 digit (10D) trigger type, a terminating attempt trigger (TAT) type. Additional trigger types may be added.

According to another aspect of the present invention, the service control point further comprises a plurality of trigger call processing records (CPR) based on the same trigger template associated with each of the plurality of trigger call processing records being associated with one of a plurality of trigger types and the subscriber, each of the trigger CPRs including information regarding services of the subscriber.

According to yet another aspect of the present invention, the subscriber service information includes the operational status and activation dates of services, and trunking information.

According to yet another aspect of the present invention, each of the trigger CPRs are associated with a subscriber telephone number at the service control point. The trigger CPRs comprise trigger graphs associated with the trigger type set by the subscriber telephone number in the service control point, and the service control point comprises a device for selecting one of the trigger CPRs based on a trigger type of the trigger encountered at the service switching point.

The above-listed and other objects, features and advantages of the present invention will be more fully set forth hereinafter.

BRIEF DESCRIPTION OF THE DRAWINGS

The present invention is further described in the detailed description that follows, by reference to the noted plurality of drawings by way of non-limiting examples of preferred embodiments of the present invention, in which like references numerals represent similar parts throughout the several views of the drawings, and wherein.

DETAILED DESCRIPTION OF THE PREFERRED EMBODIMENTS

Many telephone services may be provided using an AIN or AIN-type network arrangement for centralized control of telephone services offered to customers, as opposed to localized control of services at the Central Office (CO) or End Office (EO). An AIN system may be provided through interaction between switching points and other systems supporting AIN logic.

According to an aspect of the present invention, an apparatus and method for managing a plurality of customer services may be implemented using an AIN or AIN-type network. In particular, an AIN network with at least AIN Release 0.0 or AIN Release 0.1 protocols and advanced intelligent network capabilities may be utilized to implement the various features and aspects of the invention. It should be noted, however, that the implementation of the present invention is not limited to AIN-based networks, and other advanced or intelligent networks and arrangements may be used to implement the invention.

Figure 1:
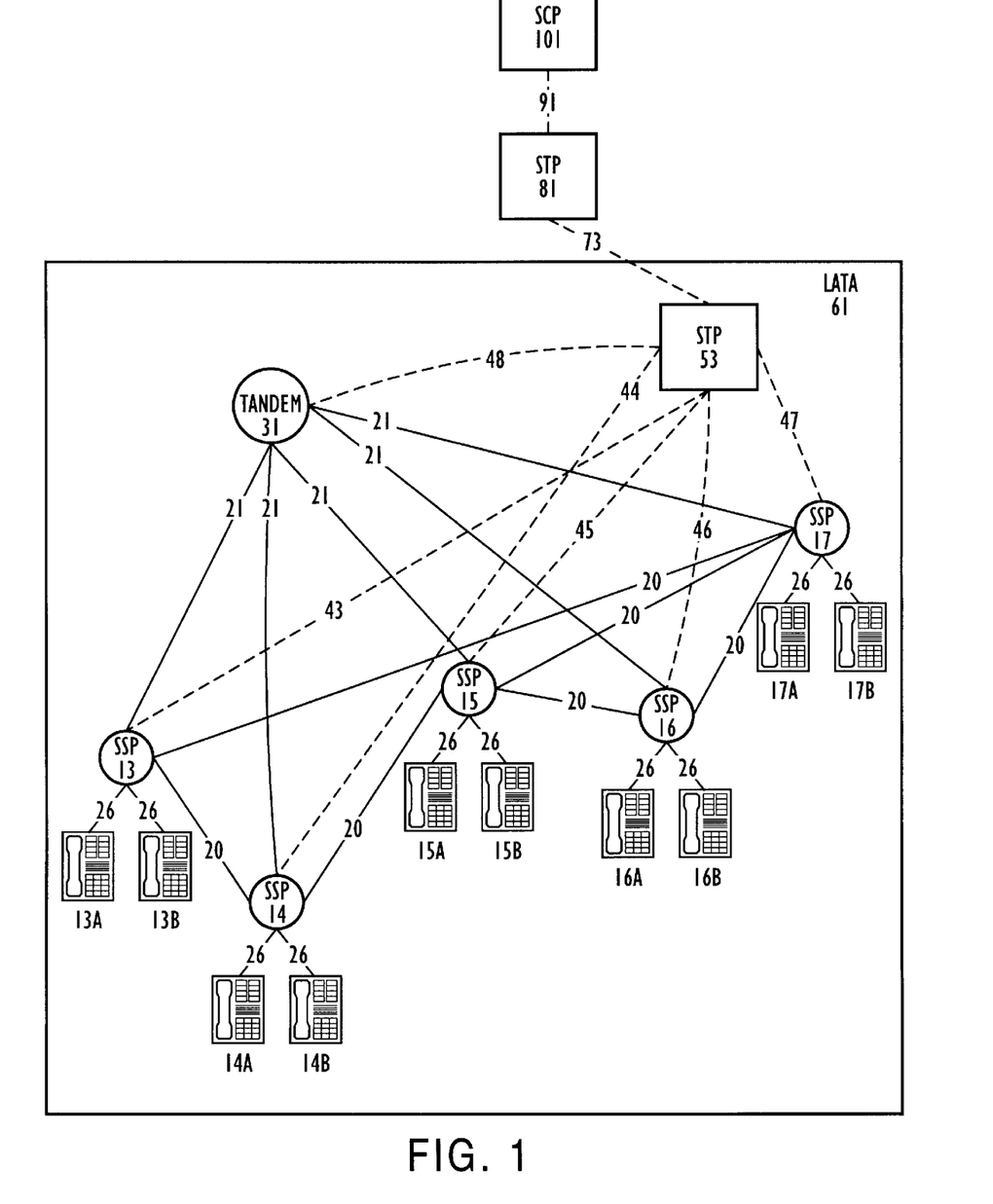
FIG. 1 illustrates, in a general block diagram form, an Advanced Intelligent Network (AIN) based system for implementing intelligent network management features, in accordance with an embodiment of the present invention.

Referring now to the accompanying drawings, FIG. 1 illustrates an AIN-based network arrangement incorporating the various features of the invention, as further described below. In the embodiment of FIG. 1, a telephone network within LATA 61 is provided that defines a calling service area. The LATA 61 includes stations, e.g., stations 13A, 13B, 14A, 14B, 15A, 15B, 16A, 16B, 17A and 17B, and corresponding switches, e.g., service switching points (SSP) or end offices (EO) 13, 14, 15, 16 and 17. The EOs 13, 14, 15, 16 and 17 may comprise, for example, 1AESS or 5ESS switches manufactured by, for example, Lucent Technologies, Inc., having AIN Release 0.1 capabilities and protocols, or DMS-100 switches manufactured by, for example, Nortel having AIN Release 0.1 capabilities and protocols, or in the case of the 1AESS, additionally having AIN Release 0.0 capabilities and protocols. Additionally, it may be possible for the DMS-100 and 5ESS switches to have AIN Release 0.0 capabilities and protocols. Further, in accordance with an aspect of the present invention, as new AIN Releases and protocols (e.g., AIN Release 0.2) are introduced, the capabilities of the SSPs and the service logic of the present invention may be upgraded accordingly.

In the example shown in FIG. 1, each switch may include different types of facilities and/or triggers. The SSPs 13–17 are each programmable switches which: recognize AIN-type calls; launch queries to service control point (SCP) 101; and, receive commands and data from SCP 101 to further process and route AIN-type calls. When one of the SSPs is triggered by an AIN-type call, the triggered SSP formulates an AIN service request and responds to call processing instructions from the network element in which the AIN service logic resides. According to an aspect of the invention, the AIN service logic may reside in a database at SCP 101.

As further shown in FIG. 1, either a direct route or a tandem route may exist between all switches. In LATA 61, direct trunks 20 exist between SSP 13, SSP 14, SSP 15, SSP 16 and SSP 17. Assuming LATA 61 to be a large service area, direct trunks may not be available between each switch, either due to geographical limitations or due to excessive traffic. For example, SSP 13 may alternatively use tandem trunk 21 to a tandem switch 31 and may use trunk 21 to SSP 17 to terminate an offered call. This alternative path may be an overflow route for traffic that cannot find room on trunk 20 between SSP 13 and SSP 17. The trunks 21 and 22 may be either SS7 controlled multi-frequency trunks (MF), or primary rate interface (PRI) trunks, and the type of trunk will be in accordance with both the sending and receiving SSP to which it is connected. If either of the SSPs is a 1AESS type switch, the trunk will be an SS7 controlled MF type trunk as the 1AESS is not capable of supporting PRI trunks. However, if both the sending and receiving switches are either a DMS-100 switch or a 5ESS switch, the trunk may be either an SS7 controlled MF type trunk or PRI type trunk.

Each office equipped as an AIN SSP may allow normal switch processing to be suspended at specific points in a call so that the switch may send an AIN message query to SCP 101. Alternatively, SCP 101 may comprise an integrated service control point (ISCP). Service control point 101 may execute software based service logic and return call processing instructions to the triggering AIN SSP. New services may be provisioned by assigning AIN SSP triggers to customer lines, trunks, and/or NANP telephone numbers. As noted above, the SSPs may include, but are not limited to, 5ESS, 1AESS, and DMS-100 switches. The 5ESS switches may utilize an AIN Release 0.1 protocol and should be equipped with Generic 5E9.1 (or higher) software and associated AIN SSP features in order to serve customers. The 1AESS switches may use an AIN Release 0.0 protocol or an AIN Release 0.1 protocol, and should be equipped with Generic 1AE12.03 (or higher) software and associated AIN SSP features in order to serve customers. The DMS switches may utilize an AIN Release 0.1 protocol and should be equipped with Generic BCS-36 (or higher) software and associated AIN SSP features. Specifications of AIN Release 0.1 SSPs may be found in Bellcore documents TR-NWT-001284, "Advanced Intelligent Network Release 0.1 Switching System Generic Requirements", Issue 1 (August 1993) and TR-NWT-001285, "Advanced Intelligent Network 0.1 Switch-Service Control Point Application Protocol Interface Generic Requirements", Issue 1 (August 1992) from Bell Communications Research, Inc., of Livingston, N.J., the disclosures of each document is incorporated by reference herein in its entirety.

As described above, within LATA 61 is a tandem switch 31 that is connected to each of the SSPs 13–17. The tandem switch 31 is coupled to each of the SSPs 13–17 of LATA 61 by trunks 21. Trunks 21 may interconnect tandem switch 31 with each SSP within LATA 61 for routing of telephone calls. However, trunks 21 may also be used to connect tandem switch 31 to, e.g., toll calls that terminate on SSPs (not shown) outside LATA 61; and, calls originating outside of LATA 61 but terminating on an SSP within LATA 61.

As noted above, the SCP 101 may comprise an integrated service control point (ISCP). The ISCP is an integrated system which may include a service management system (SMS), a data and reports system (DRS), a programmable service control point (SCP), and a service creation environment (SCE). The SCE may be provisioned as a terminal implemented to work with SMS to create, modify, and load services into the SCP database. The SCE may comprise, for example, a programming environment (such as the SPAC-E$^{SM}$ programming environment that is available from Bellcore) for creating and provisioning services. The SCP may execute software-based service logic and return call routing instructions to the triggering SSPs. The SMS may be provided for administrative purposes to synchronize customer CPR and data on the mated pair of ISCPs that SCP 101 represents. The DRS may be provided for compiling call information to be used for billing and administrative purposes. By way of example, the ISCP may be implemented with a Bellcore Integrated Service Control Point (ISCP), loaded with preferably at least ISCP software Version 4.0 (or higher), available from Bell Communications Research, Inc., of Livingston, N.J.

In order to facilitate signaling and data messaging, each SSP and tandem switch within the multiple location communications network for facilitating remote access is equipped with Common Channel Signaling (CCS) capabilities, e.g., Signaling System 7 (SS7), which provides two-way communications of data messages over CCS links 43, 44, 45, 46, 47, 48, 73 and 91 between each SSP and tandem switch 31 and the SCP 101. The data messages may be formatted in accordance with the Transaction Capabilities Applications Part (TCAP). Alternatively, ISDN Users Part (ISUP) may be used for signaling purposes between, for example, SSPs 13–17. In such a case, the SSPs may be equipped with the capability to map appropriate data between TCAP and ISUP protocols, and vice versa. The telephone network essentially employs an upper-level software controlled network through the Signaling Transfer Points (STPs) and the SCP (and/or ISCP). The software presides over the hardware to check the call route and the availability of connection prior to hardware connection.

Accordingly, the connections by links 43–48, link 73, and link 91 through STPs 53 and 81 are for signaling purposes, and allow each of the SSPs 13–17 to send and receive messages to and from SCP 101 via the STPs. As shown for example in FIG. 1, a local STP 53 may act as the data messaging control point for LATA 61. That is, all data messages from SSPs within LATA 61 or directed to SSPs within LATA 61 may be transmitted through STP 53. Accordingly, CCS links 43–48 are shown establishing a data link between STP 53 and either the tandem switch 31, SSP 13, SSP 14, SSP 15, SSP 16 or SSP 17. Further, one or more regional STPs may be provided for data messaging with each of the LATA. In FIG. 1, regional STP 81 is illustrated as receiving and transmitting data messages with LATA 61 by connecting to STP 53 by line 73 and connecting to SCP 101 by link 91.

Communications Network Triggers and Hardware
1. AIN Triggers

The present invention contemplates at least three AIN triggers that may be implemented on the above-described AIN SSPs to facilitate accessing the subscribed features of the multiple location communications network to provide remote access. The 5ESS and DMS-100 AIN SSPs may be provisioned with a termination attempt trigger (TAT), and a 10 digit trigger (10D). The 1AESS AIN SSP may be provisioned with a dialed line number trigger (DLN), which is equivalent to the TAT. According to the present invention, other types of triggers may be quickly and easily added.

A. Terminating Attempt Trigger

The TAT is a subscribed trigger that may be assigned to a directory number/call type, and is associated with AIN Release 0.1. Thus, the TAT may be assigned to a directory number that may or may not have any physical facilities assigned to it, i.e., the switch need not be within a network SSP. Whether physical facilities are associated with the TAT trigger may depend on whether the switch type requires an association between a telephone number (TN) and line equipment or DID trunk before a TAT can be placed on the TN. For example, DMS-100 and 1AESS switches do not require physical facilities for a TAT, but a 5ESS switch does require physical facilities for a TAT. The TAT may be assigned a trigger that includes, e.g., a seven to ten digit number that is dedicated solely for the purpose of triggering AIN functionality. The TAT may be implemented with AIN Release 0.1. On the 5ESS, the TAT trigger is preferable if there are less than, for example, 100 simultaneous trigger events expected per TN.

B. 10 Digit Trigger

The 10 digit trigger is an office based trigger that may be assigned to a dialed number, and is associated with AIN Release 0.1. Accordingly, the 10 digit trigger may be programmed to recognize a dedicated or designated telephone number and to trigger AIN functionality in response to recognizing the designated telephone number.

On the 5ESS switch, a 10D trigger is preferable if there are more than, for example, 99 simultaneous trigger events expected per TN.

C. Dialed Line Number Trigger

The dialed line number trigger (DLN) is functionally the same as the TAT, except that the DLN is implemented with AIN Release 0.0 or Release 0.1. Accordingly, the DLN may be programmed to recognize a dedicated or designated telephone number and to trigger AIN functionality in response to recognizing the designated telephone number.

2. Service Control Point

The present invention may require several service logic programs (or call processing records (CPR)) to fully implement the subscriber's desired service features within a single network. Each CPR may be triggered based on calls directed to the subscriber. The trigger CPR may have one or more graphs to permit a subscriber's telephone number to be compatible with different AIN releases. For example, each subscriber may have a TN associated with a trigger CPR having a trigger graph for an AIN Release 0.0 implementation of subscribed service, and a trigger CPR for an AIN Release 0.1 implementation of the subscribed service. However, common service logic for both AIN releases may be in the same CPR with protocol particular logic. The CPR may have a number of associated tables to be accessed by the SCP in implementing the particular service logic. It is also noted that each terminating and originating station may have a trigger CPR, depending on the trigger implemented by the provisioner. Generally, a trigger CPR may be small and may include one or more graphs. Each graph within a trigger CPR may include at least two nodes (i.e., branch points within the service creation logic). For example, the graph may contain interconnected nodes to provide the service creation logic. In addition, each trigger CPR may include at least one call variable used by each graph to create the appropriate service logic. A graph may also use constants and call variables in executing the service logic. In addition, the call variables may be exclusive to a graph, shared among all graphs of a CPR, or shared among multiple CPRs. Call variables may be predefined from SS7 queries or for use in SS7 responses. Predefined call variables are typically related to messages (e.g., query, conversational, or response) between the SSP and the ISCP or ISCP and machine constants, such as time-of-day. A particular type of call variable may be an embedded table. Typically, embedded tables are not defined before being used. Call variables may be service creator defined and may include subscriber supplied data, or may be temporarily defined during the execution of the service logic. Further, call variables may be restricted to the graph in which it is defined or to the CPR in which it is defined. A stand alone table is a unique object at the same level as a CPR. Embedded tables and stand alone tables are not a subset of CPRs equivalent to graphs in the SCP.

At the SCP, a CPR that has been converted into an object is called a template. A template "freezes" the service logic an allows user defined call variables to be reset to provisionable parameters that have label fields in the template to assists the user in setting the value of provisionable parameters.

The service provisioner needs to know the AIN release or version of each network station's serving SSP because the SCP may use the telephone number and the AIN trigger type to generate a unique key or code for access to AIN functionality. Because AIN Release 0.1 and AIN Release 0.0 are different, some aspects of a service may need to be separated according to the AIN release. Further, to create a unique key for access to AIN functionality, the AIN release may be needed to ensure that the proper service creation features and the protocols are utilized for effective and accurate communication with the SSP.

According to the present invention, the trigger CPR may include separate graphs or service logic for each trigger (e.g., TAT, 10D and DLN), so as to support all trigger types within one set of subscriber provided data for call variables. Separate CPRs or graphs may also be provided for each of AIN Release 0.0 and Release 0.1 in order to improve performance; however, it is possible to use a single CPR to support the service features of the invention across AIN releases, as the individual tables stored in the SCP may be designed to accommodate all AIN versions of the present service. Accordingly, the CPR may need to know what type of SSP is providing the AIN trigger and query message. The present invention may be adapted for use with terminating triggers or originating triggers. The terminating (or originating, if applicable) trigger CPR may be designed to transfer control to an appropriate "transfer in" graph to translate the switch commands into common call variables usable by the CPR to continue the service logic. Use of the "transfer in" graph ensure maximum software reuse but may decrease SCP performance (capacity). A major function of the "transfer in" graph is to transform data in either AIN Release 0.0 or in AIN Release 0.1 protocol to generic, protocol insensitive values that the common service logic CPR can process. At the end of the common service logic CPR, control is transferred over to a "transfer out" graph to prepare an appropriate protocol response to send back to the SSP. Optionally, rather than employing a "transfer in" graph, the predefined call variables from the query and provisionable parameters may be used as is to transfer control.

When the triggering event, i.e., termination or origination of the offered call, occurs, the SSP may send a query for that calling party number (CPN) to the SCP. The SCP may use the CPN for screening and/or billing purposes as defined in the CPR.

Feature Interaction and Management Service Logic

For purposes of illustration, various features of the present invention will now be described from the standpoint of a switch implementing either AIN Release 0.1 protocols or AIN Release 0.0 protocols, and the CPR provisioned with TAT, 10D or DLN triggers. However, as will be apparent to those of ordinary skill in the art based on the disclosure provided herein, the present invention is not limited to implementation through AIN Release 0.1 or Release 0.0, and may be designed and provisioned with a network utilizing triggers associated with future AIN releases and trigger types.

The present invention provides a management capability which allows a subscriber to subscribe to a plurality of services which, under most circumstances, will be run together. A subscriber, such as an individual or small business, may desire to have one or more "simple" services, which are defined as those services which may be manually provisioned or provisioned through an automated provisioning interface, such as SMS. Examples of such services and their associated service logic may be found in the following commonly-assigned U.S. patent applications: U.S. patent application Ser. No. 08/473,919, entitled "Apparatus and Method for Recording Call Related Data" (which discloses a Caller IntelliData service that collects and compiles data relating to incoming calls to a subscriber's telephone number, hereinafter referred to as "CID" service); U.S. Pat. No. 5,592,541, entitled "Apparatus and Method for Forwarding Incoming Calls" (which discloses a disaster routing service, hereinafter referred to as "DRF" service); and, U.S. patent application Ser. No. 08/608,400, entitled "Advanced Intelligent Single Telephone Number Routing" (which discloses an IntelliNumber service for rerouting calls directed to a single number service to one of multiple locations based on the location of the calling party, hereinafter referred to as "INS" service), the disclosures of which are incorporated by reference herein in their entireties.

The management and prioritization features of the present invention advantageously allow potential customers or subscribers to combine the many desirable features of simple services. While the available options will generally be described herein as if provisioned in the alternative, it is contemplated that these options may be combined in any of a wide variety of combinations to provide a single complex service, if desired.

Figure 2:
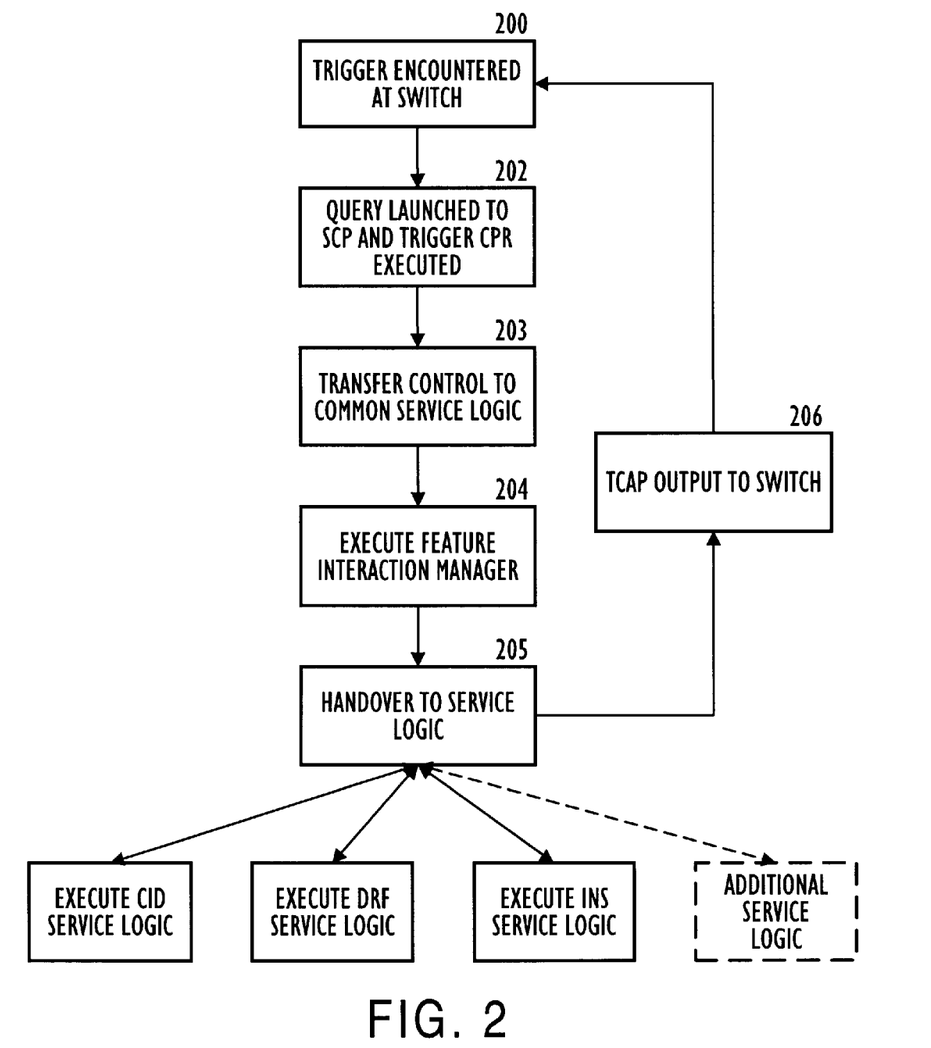
FIG. 2 illustrates an exemplary flow diagram of call processing, according to an aspect of the present invention.
Figure 3:
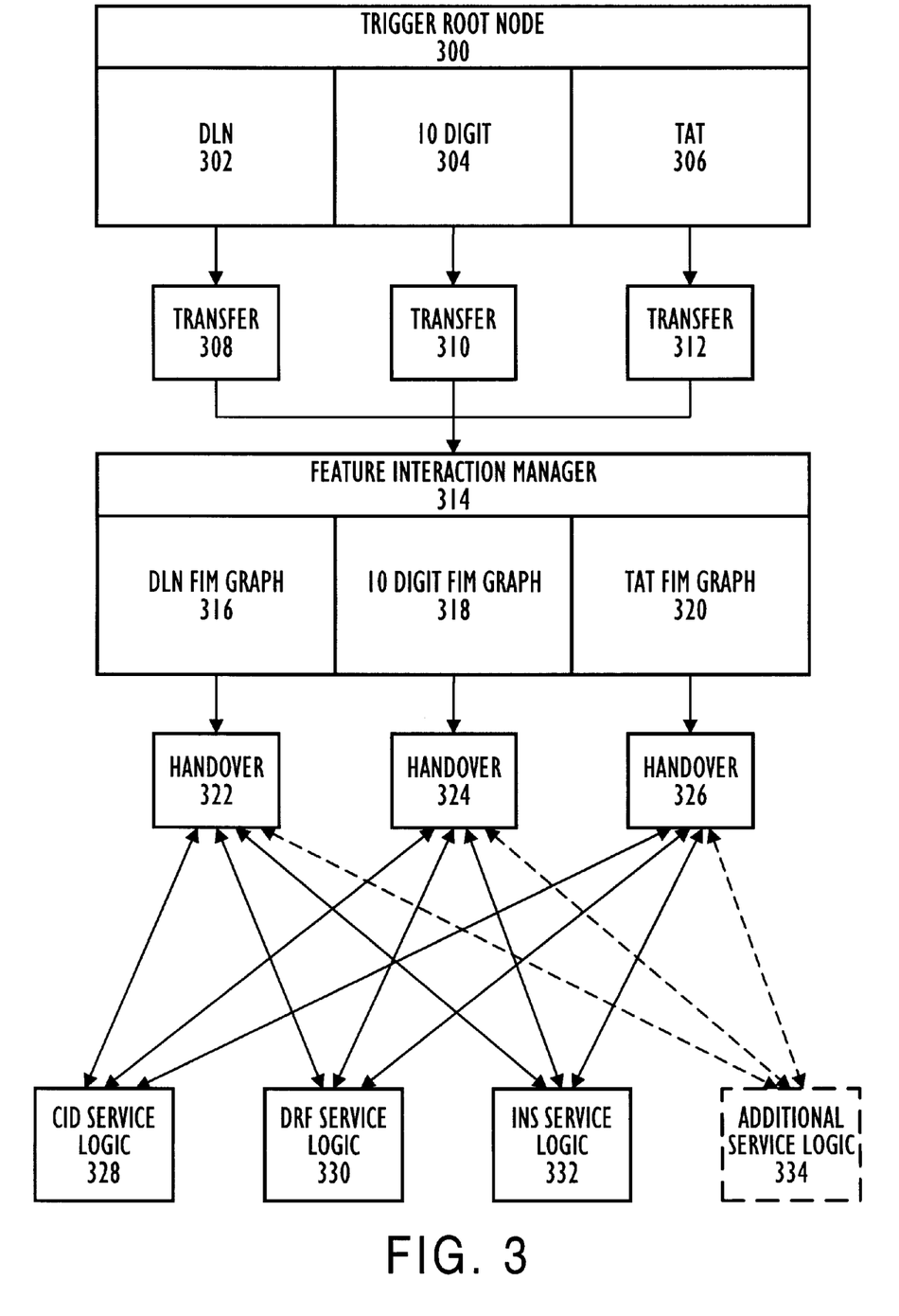
FIG. 3 illustrates an exemplary schematic implementation of trigger CPRs and a feature interaction manager, according to another aspect of the present invention.

Referring now to the drawings, there is illustrated an exemplary overview of the call flow logic in FIG. 2, and, in FIG. 3, an exemplary schematic of a trigger CPR and a feature interaction manager, according to an aspect of the present invention. As noted above, the call flow logic of the present invention is designed to operate with AIN Release 0.0 and Release 0.1 protocols, and with at least a Dialed Line Number trigger (DLN), 10 Digit (10D) trigger, Terminating Attempt Trigger (TAT) types, and other trigger types may be added.

At step 200, when a calling party at, for example, station 17A attempts to complete a call to a called party (i.e., the subscriber), a switch (e.g., SSP 13) encounters either a DLN (1AESS), 10D (5ESS), or TAT (DMS-100) trigger.

Upon encountering the trigger, the call is suspended at the switch and a query message is sent to the SCP 101 via the CCS links and the appropriate trigger CPR is executed at the SCP 101, as shown in step 202. According to an aspect of the invention, the query message, which may be formatted according to standard TCAP parameters, may include the subscriber's number dialed by the calling party, as well as other information (such as the originating telephone number, etc.) The protocol of the query message will depend upon the switch type that encountered the trigger. The protocol of the query message may be utilized to determine and select the appropriate trigger CPR at the SCP. For terminating trigger types, the trigger CPR that is selected will depend upon the subscriber TN.

As schematically represented in FIG. 3, the SCP 101 may include internal logic that is invoked subsequent to an SS7 query decode at the SCP. The SS7 query decode may be performed by a decode module (represented by trigger root node 300) to determine the service key name (which may be, for example, a 10 digit TN and trigger type).

The service key name determines, in combination with the internal logic, the trigger CPR, and the trigger type (e.g., DLN, TAT, 10D, etc.) determines which of graphs DLN 302, 10 Digit 304, and TAT 306 in the trigger CPR is to be accessed. Although three trigger graphs are shown in FIG. 3, the present invention is designed to allow the addition of other trigger graphs to support future trigger types as well as simple services. Each trigger graph in the trigger CPR may contain two graphical service creation language nodes, e.g., a root entry node, and a transfer node. The root entry node acts as a starting point for the service logic, while the transfer node transfers control to a corresponding trigger sensitive graph in the feature interaction manager (FIM) CPR, which is described below.

The trigger CPR includes customer specific information provisionable call variables that may (but are not required to) apply to all subtending trigger graphs. The provisionable call variables are not used in the trigger CPR. The provisionable call variables contain information regarding a subscriber's services, such as, information particular to each of the subscribed (active) services, activation dates, and trunking information.

At step 203, the called trigger graph (i.e., one of DLN 302, 10 Digit 304, and TAT 306) transfers control to the common service logic of the present invention, which includes a feature interaction manager 314, comprising DLN FIM trigger sensitive graph 316, 10D FIM trigger sensitive graph 318 and TAT FIM trigger sensitive graph 320, that may be located at the SCP 101. As noted above, each of the trigger graphs 302, 304 and 306 may be provided with a corresponding transfer node (e.g., transfer nodes 308, 310, and 311, respectively) comprising logic and commands for transferring control to the feature interaction manager 314. Thus, as shown in the illustration of FIG. 3, the DLN trigger graph may comprise DLN 302 and transfer node 308, the 10D trigger graph may comprise 10D 304 and transfer node 310, and the TAT trigger graph may comprise TAT 316 and transfer node 312.

Once control is transferred to the feature interaction manager 314, the respective trigger object will never regain control for the particular call request. All decision making is made by the feature interaction manager 314 and responsibility for determining which services will be called and when to hand-over control to the appropriate logic of each simple service is performed by the feature interaction manager 314.

The feature interaction manager 314 is executed at step 204 to prioritize and manage the interaction of the various customer services in accordance with the type of trigger encountered at step 200. In operation, the feature interaction manager 314 will determine the order of invocation of the service logic CPRs. The invocation of service will depend on the customer's provisionary requirements. As shown in FIG. 3, the feature interaction manager 314 comprises DLN FIM trigger sensitive graph 316, 10 Digit FIM trigger sensitive graph 318, and TAT FIM trigger sensitive graph 320 to support all possible types of encountered triggers other trigger type related graphs may be added to the feature interaction manager 314 depending on the type of triggers that are to be supported. The DLN FIM trigger sensitive graph 316, 10 Digit FIM trigger sensitive graph 318, and TAT FIM trigger sensitive graph 320 are explained in greater detail below with reference to FIGS. 4, 5, 6A and 6B.

Each of DLN FIM trigger sensitive graph 316, 10D FIM trigger sensitive graph 318 and TAT FIM trigger sensitive graph 320 respectively corresponds to DLN trigger graph 302, 10 Digit trigger graph 304, and TAT trigger graph 306. As each of DLN FIM trigger sensitive graph 316, 10D FIM trigger sensitive graph 318 and TAT FIM trigger sensitive graph 320 will send a response back to the SSP encountering the trigger, the feature interaction manager 314 should be trigger sensitive, as the protocol required or permitted in a response varies by trigger type. The feature interaction manager may operate as a "transfer out" graph (as described above). Preferably, the feature interaction manager 314 should perform a limited formatting of predefined call variables, and the service logic of each of the subscriber's services should perform formatting of predefined call variables.

At step 205, the feature interaction manager performs a handover (illustratively shown in FIG. 3 as handover node 322, 324, or 326 in accordance with the trigger type) to the appropriate service logic CPRs to execute the service logic of the active services (e.g., CID service, DRF service, INS service, or any additional (i.e., future) service). The handover nodes 322, 324 and 326 may comprise logic or commands for transferring control to the appropriate service logic CPR. Further, similar to the DLN, 10D and TAT trigger graphs, the DLN FIM trigger sensitive graph may comprise DLN FIM trigger sensitive graph 316 and handover node 322, the 10D FIM trigger sensitive graph may comprise 10D FIM trigger sensitive graph 318 and handover node 324, and the TAT FIM trigger sensitive graph may comprise TAT FIM trigger sensitive graph 320 and handover node 326.

After completion of a particular service logic, control is passed back to the feature interaction manager 314 which then checks the appropriate user defined call variables included in the template's provisionable parameters. The user defined call variables may be service specific (i.e., contain information related to a particular service) or user specific (i.e., contain information on how a particular subscriber's service is to be executed). The templates provisionable parameters determine if the subscriber has the next service indicated by the feature interaction manager 314 logic (to be explained in greater detail below with reference to FIGS. 4, 5, 6A and 6B). This process is continued until completion of the feature interaction manager 316 logic.

After completion of the feature interaction manager 314 logic, at step 206, the feature interaction manager 314 outputs TCAP formatted data to the switch that initially encountered the trigger at step 200. Step 206 is executed after the last of the customer's active services has completed in accordance with the decision process of the feature interaction manager 314, and after control has been returned to the feature interaction manager 314. The appropriate TCAP message is passed to the switch which encountered the trigger to then route the call to its final destination or to otherwise dispose of the call in the appropriate manner.

Figure 4:
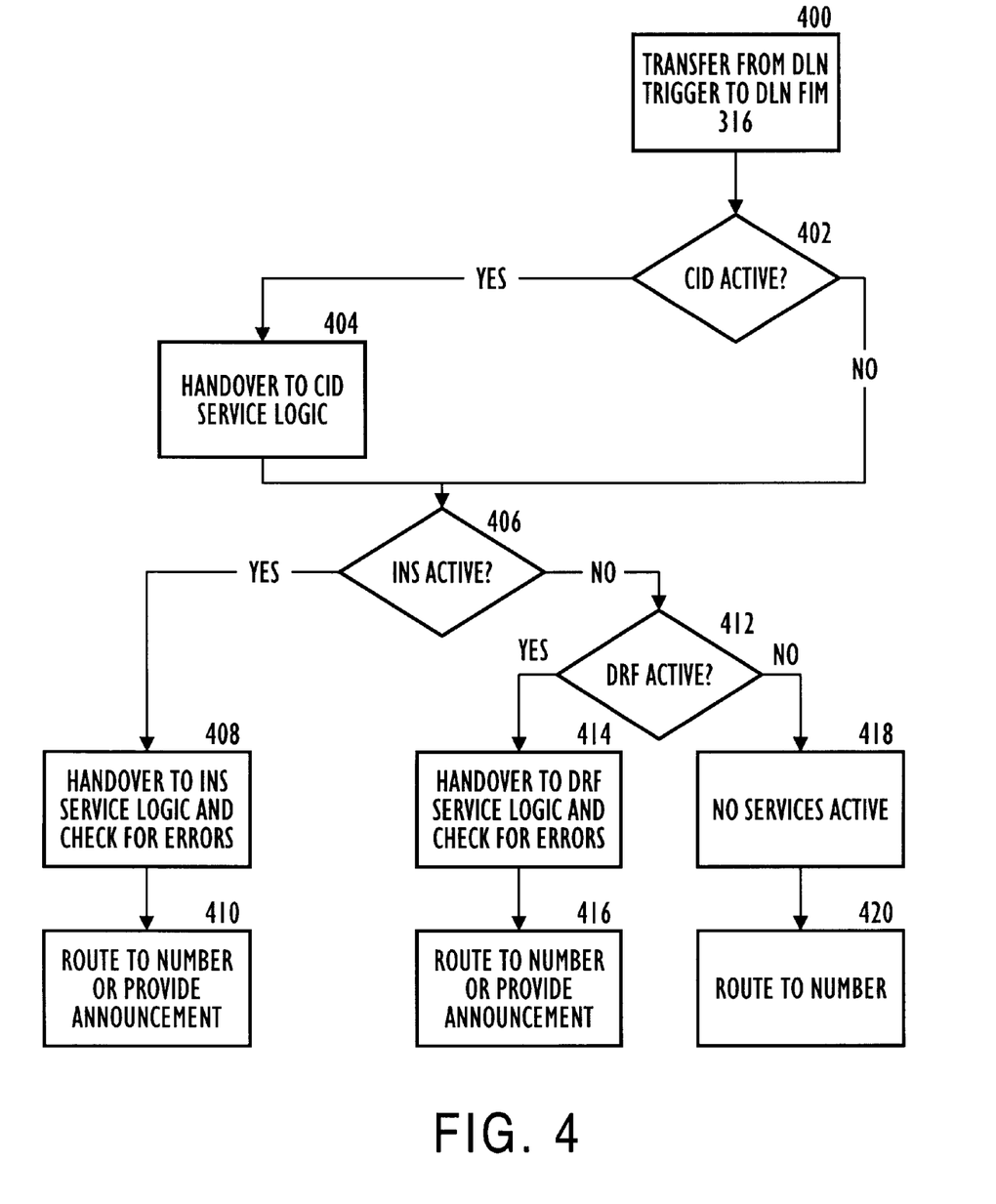
FIG. 4 illustrates an exemplary call service logic when a Dialed Line Number Trigger is encountered by a switch.

Referring now to FIG. 4, there is shown an exemplary logic flow for a call processing decision process for the DLN FIM trigger sensitive graph 316. The DLN FIM trigger sensitive graph 316 manages the interaction of the simple services when a switch encounters a DLN trigger. The call processing shown in FIG. 4 is merely for illustrative purposes, and alternative call processing and interaction among the customer services may be provided within the scope of the present invention. As described below, in the exemplary decision process, the simple services interact in a hierarchical manner, and some of the simple services may not be executed with other simple services.

At step 400, the DLN trigger graph 302 transfers (illustratively shown in FIG. 3 by transfer 308) to the service logic of DLN FIM trigger sensitive graph 316. After the DLN FIM trigger sensitive graph 316 has been initialized, at step 402, it is determined if CID service is active. As noted above, the status of the services for each subscriber may be indicated by the trigger CPR. Call variables may be analyzed to determine if a particular service, such as CID service, is active. If CID service is not active, then control flows to step 406 to determine if INS service is active. If CID service is active, then, at step 404, the DLN FIM trigger sensitive graph 316 performs a handover (illustratively shown in FIG. 3 by handover node 322) to the CID service logic 328. Upon completion of the CID service logic 328 at step 404, control is returned to the DLN FIM trigger sensitive graph 316, where, at step 406, it is determined if INS service is active.

If at step 406 it is determined that INS service is active, then, at step 408, the DLN FIM trigger sensitive graph 316 performs a handover (illustratively shown in FIG. 3 by handover node 322) to the INS service logic 332. At step 408, error checking and the INS service logic 332 are also executed. If an error is encountered (e.g., an undefined or incompatible situation), an announcement is played at step 410 informing the caller to contact, for example, repair service. If no errors are encountered at step 408, then at step 410, the call is routed to the subscriber in accordance with the INS service logic 332.

If at step 406 it is determined that INS service is not active, then, at step 412, the DLN FIM trigger sensitive graph 316 determines if DRF service is active. If it is determined at step 412 that DRF service is active, then control flows to step 414 where the DLN FIM trigger sensitive graph 316 performs a handover (illustratively shown in FIG. 3 by handover 322) to the DRF service logic 330. At step 414, error checking and the DRF service logic 330 are executed. If an error is encountered (e.g., an undefined situation) an announcement is played at step 416 informing the caller to contact, for example, repair service. If no errors are encountered at step 414, then at step 416, the call is handled or routed to the subscriber in accordance with the DRF service logic 330.

If at step 412 it is determined that DRF service is not active, then it is determined the subscriber has no services active at step 418. Control then flows to step 420 where the call is routed to the subscriber in accordance with normal call processing.

Figure 5:
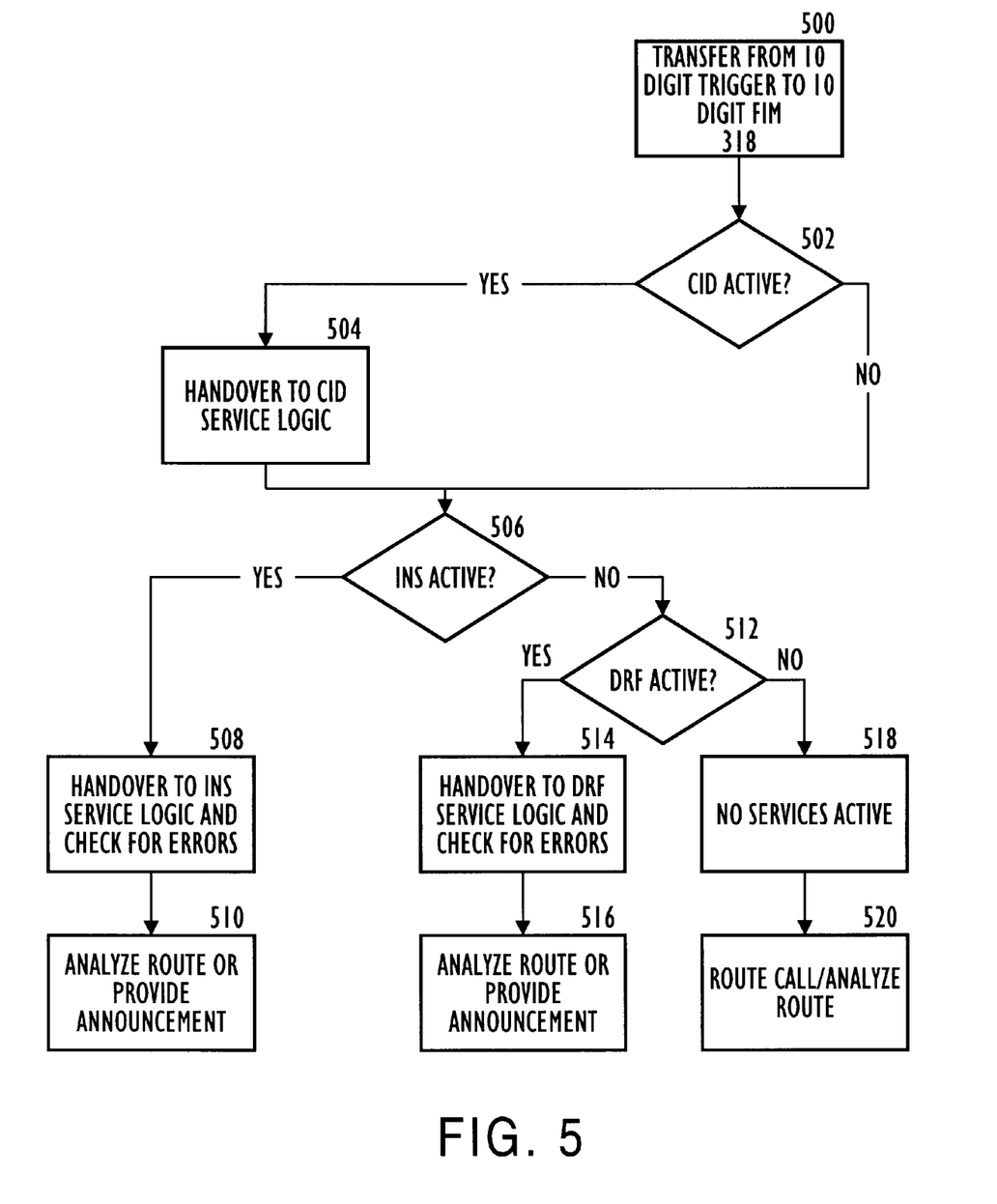
FIG. 5 illustrates an exemplary call service logic when a 10 Digit Trigger is encountered by a switch.

Referring now to FIG. 5, there is shown an exemplary logic flow for a call processing decision process for the 10 Digit FIM trigger sensitive graph 318. The 10 Digit FIM trigger sensitive graph 318 manages the interaction of the simple services when a switch encounters a 10 Digit trigger. The call processing shown in FIG. 5 is merely for illustrative purposes, and alternative call processing and interaction among the customer services may be provided within the scope of the present invention. As described below, in the exemplary decision process, the simple services interact in a hierarchical manner, and some of the simple services may not be executed with other simple services.

At step 500, control is transferred to the 10 Digit FIM trigger sensitive graph 318 by 10 Digit trigger graph 304 (illustratively shown in FIG. 3 by transfer node 310). At step 502, it is determined if CID service is active. If CID service is not active, then control flows to step 506 to determine if INS service is active for the subscriber. If CID service is active, then, at step 504, the 10 Digit FIM trigger sensitive graph 318 performs a handover of control (illustratively shown in FIG. 3 by handover node 324) to the CID service logic 328. Upon completion of the CID service logic 328 at step 504, control is returned to the 10 Digit FIM trigger sensitive graph 318, where, at step 506, it is determined if INS service is active.

If at step 506 it is determined that INS service is active, then at step 508, the 10 Digit FIM trigger sensitive graph 318 handovers control (illustratively shown in FIG. 3 by handover node 324) to the INS service logic 332. At step 508, error checking and the INS service logic 332 are executed. If an error is encountered (e.g., an undefined situation), an announcement may be played at step 510 informing the caller to contact, for example, repair service. If no errors are encountered at step 508, then at step 510, the call is handled or routed to the subscriber in accordance with the INS service logic 332.

If at step 506 it is determined that INS service is not active for the subscriber, then, at step 512, the 10 Digit FIM trigger sensitive graph 318 determines if DRF service is active. If it is determined at step 512 that DRF service is active, then control flows to step 514 where the 10 Digit FIM trigger sensitive graph 318 performs a handover (illustratively shown in FIG. 3 by handover node 324) to the DRF service logic 330. At step 514, error checking and the DRF service logic 330 are executed. If an error is encountered (e.g., an undefined situation), an announcement may be played at step 516 informing the caller to contact, for example, repair service. If no errors are encountered at step 514, then at step 516, the call is handled or routed to the subscriber in accordance with the DRF service logic 330.

If at step 512 it is determined that DRF service is not active, then it is determined the subscriber has no services active at step 518. Control then flows to step 520 where the call is routed to the subscriber in accordance with normal call processing.

Figure 6A:
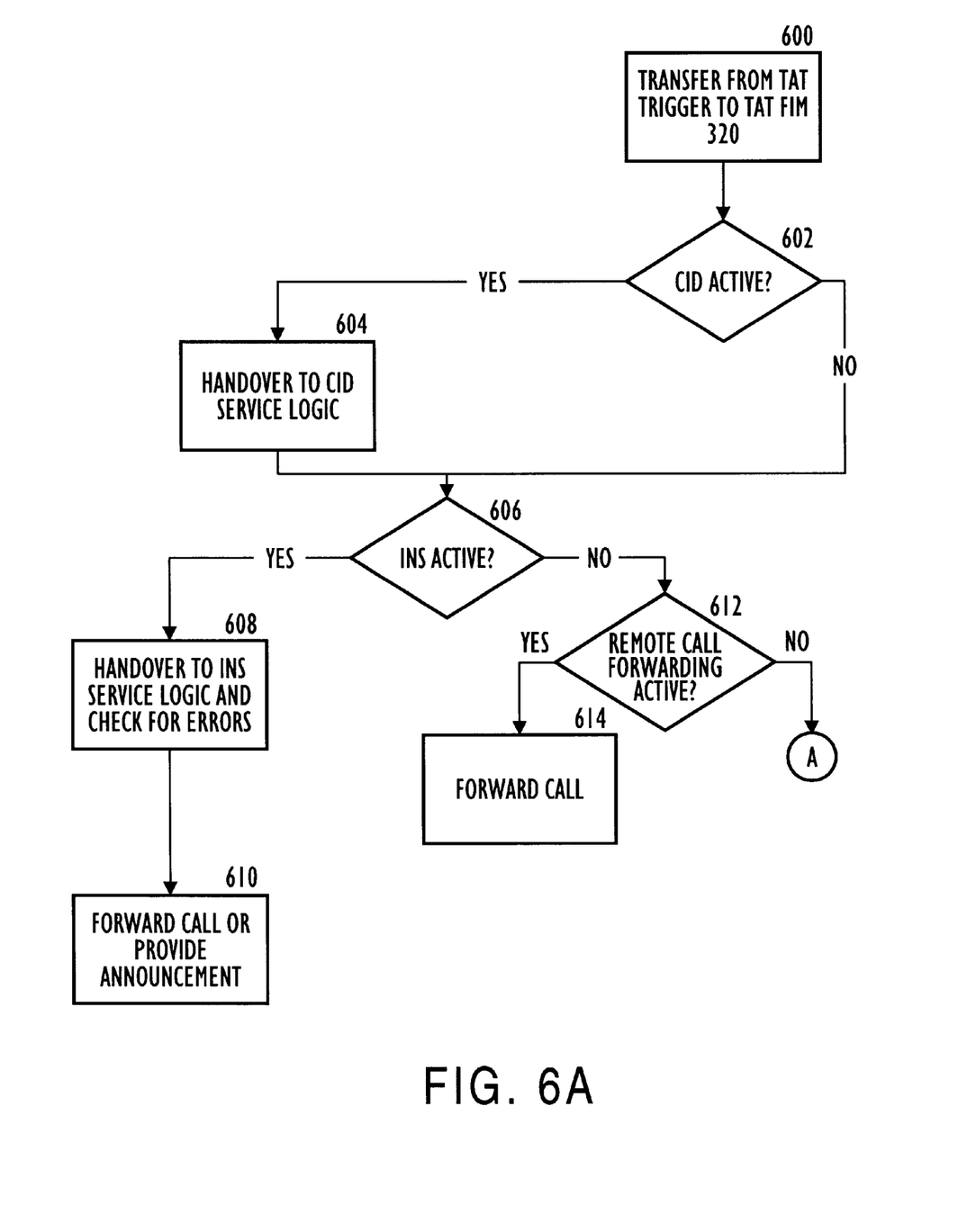
FIGS. 6A and 6B illustrate an exemplary call service logic when a Terminating Attempt Trigger is encountered by a switch.
Figure 6B:
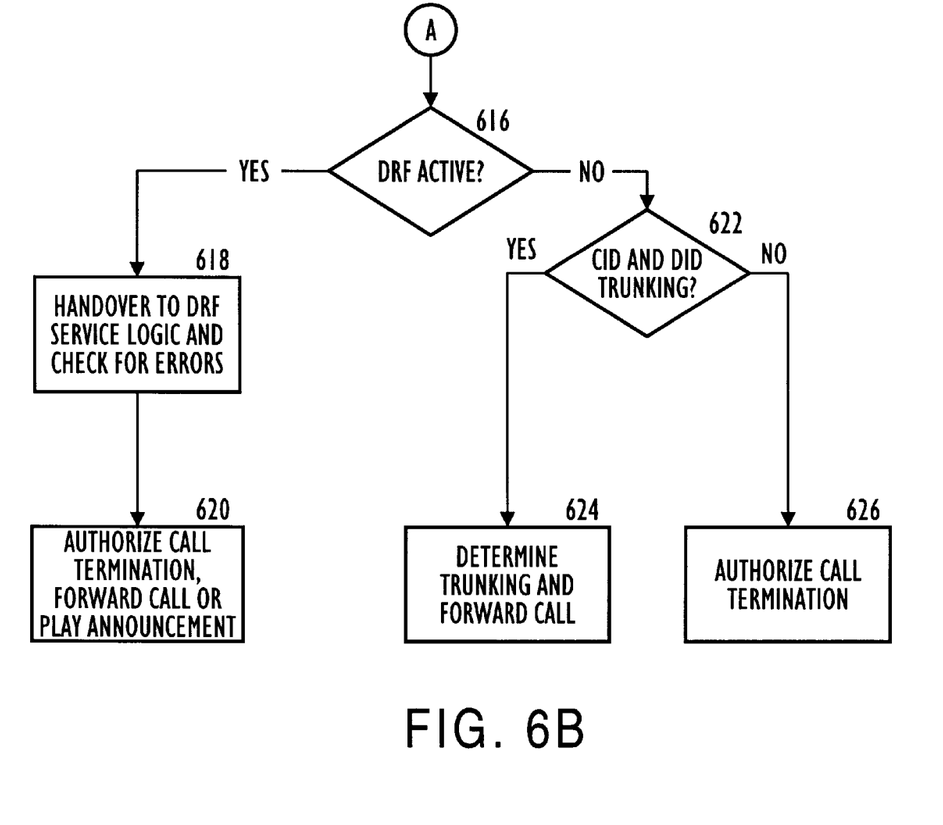

Referring now to FIGS. 6A and 6B, there is shown an exemplary logic flow of the call processing decision process for the TAT FIM trigger sensitive graph 320. The TAT FIM trigger sensitive graph 320 manages the interaction of the simple services when a switch encounters a TAT trigger. The call processing shown in FIGS. 6A and 6B is merely for illustrative purposes, and alternative call processing and interaction among the customer services may be provided within the scope of the present invention. As described below, in the exemplary decision process, the simple services interact in a hierarchical manner, and some of the simple services may not be executed with other simple services.

At step 600, control is passed to the TAT FIM trigger sensitive graph 320 from the TAT trigger graph 316 (illustratively shown in FIG. 3 by transfer node 312). At step 602, it is determined if CID service is active for the subscriber by analyzing the call variables. If CID service is not active, then control flows to step 606 to determine if INS service is active. If CID service is active, then, at step 604, the TAT FIM trigger sensitive graph 320 performs a handover (illustratively shown in FIG. 3 by handover node 326) to the CID service logic 328. Upon completion of the CID service logic 328 at step 604, control is returned to the TAT FIM trigger sensitive graph 320, where, at step 606, it is determined if INS service is active.

If at step 606 it is determined that INS service is active, then at step 608 the TAT FIM trigger sensitive graph 320 performs a handover (illustratively shown in FIG. 3 by handover node 326) to the INS service logic 332. At step 608, error checking and the INS service logic 332 are executed. If an error is encountered (e.g., an undefined situation), an announcement may be played at step 610 informing the caller to, e.g., contact repair service. If no errors are encountered at step 608, then at step 610, the call is handled or forwarded to the subscriber in accordance with the INS service logic 332.

If at step 606 it is determined that INS service is not active based on the call variables, then, at step 612, the TAT FIM trigger sensitive graph 320 may determine if a switch based forwarding service, such as remote call forwarding, is active. Remote call forwarding is a service (not one of the hereinbefore described simple services) which allows a customer or subscriber to forward an incoming call to a remote location. The determination of whether remote call forwarding is active may be based on, for example, an analysis of subscriber's number dialed by the calling party. If at step 612 it is determined that remote call forwarding is active for the customer, then at step 614 the call is forward to the customer specified remote location. If at step 612 it is determined that remote call forwarding is not active, then control flows to point "A" shown in FIG. 6B.

From point "A" control proceeds to step 616 when the TAT FIM trigger sensitive graph 320 determined if DRF service is active. If it is determined at step 616 that DRF service is active, then logic flows to step 618 where the TAT FIM trigger sensitive graph 320 performs a handover (illustratively shown in FIG. 3 by handover node 326) to the DRF service logic 330. At step 618, error checking and the DRF service logic 330 are executed. If an error is encountered (e.g., an undefined situation) an announcement is played at step 620 informing the caller to contact, for example, repair service. If no errors are encountered at step 618, then at step 620, the call is either authorized to terminate or forwarded to the subscriber in accordance with the DRF service logic 330.

If at step 616 it is determined that DRF service is not active, then, at step 622, the TAT FIM trigger sensitive graph 320 determines if CID service is active and if the subscriber has DID trunking based on the call variables. If at step 622 it is determined that CID service is active and the customer has direct inward dialing (DID) trunking, then at step 624 the SCP 101 determines the trunking route and the appropriate TCAP response is sent to the switch to forward the call to the customer location. If at step 622 it is determined that the CID service is not active, or the customer does not have DID trunking, the call is authorized for termination by the SCP 101.

As noted above, the call service logic of the present invention is designed to operate under AIN Release 0.0 and Release 0.1 protocols and with Dialed Line Number (DLN), 10 Digit (10D) trigger and a Terminating Attempt Trigger (TAT) types. Further, the call service logic of the present invention may be upgraded to accommodate future AIN releases and protocols and future trigger types, thus being able to support a wide range of AIN network infrastructure.

Further, because of the modular design of the present invention, new services may be incorporated into the service logic. For example, service logic for additional features may be added, as shown, for example, in FIGS. 2 and 3.

It is noted that the foregoing examples have been provided merely for the purpose of explanation and are in no way to be construed as limiting of the present invention. While the invention has been described with reference to preferred embodiments, it is understood that the words which have been used herein are words of description and illustration, rather than words of limitations. Changes may be made without departing from the scope and spirit of the invention in its aspects. Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed:

1. A system for managing services within an advanced intelligent communications system, said advanced intelligent communications system comprising a service control point having service logic for each service subscribed to by a service subscriber, and a two-way communications network interconnecting a plurality of dissimilar service switching points, said two-way communications network selectively establishing a communication connection between at least two of a plurality of geographically dispersed locations coupled to said dissimilar service switching points, said system comprising:

means for encountering, at one of said plurality of dissimilar service switching points, a trigger in response to a request from a calling party to establish a communication connection with a service subscriber;

means for accessing said service control point in response to said trigger encountered at said one service switching point; and means for managing, at said service control point, the operation of services of said service subscriber based on an operational status of each of said services and a predetermined prioritization of said services.

2. The system according to claim 1, said feature interaction manager comprising means for determining the operational status of each of said services, and means for activating, based on said predetermined prioritization of said services, service logic for executing a service when said service is determined to have an active operational status.

3. The system according to claim 1, wherein said managing means comprises a feature interaction manager, said feature interaction manager comprising a plurality of feature interaction graphs, each of said plurality of feature interaction graphs operating and managing said services in accordance with one of a plurality of trigger types encountered at said dissimilar service switching points.

4. The system according to claim 3, said trigger types comprising a dialed line number (DLN) trigger type, a 10 digit (10D) trigger type, and a terminating attempt trigger (TAT) type.

5. The system according to claim 1, wherein said service control point further comprises a trigger template comprising a plurality of trigger call processing records (CPR) associated with said subscriber, each of said trigger CPRs including information regarding services of said subscriber.

6. The system according to claim 5, wherein said subscriber service information includes the operational status and activation dates of services, and trunking information.

7. The system according to claim 5, wherein each of said trigger CPRs are associated with one of a plurality of trigger types encountered at said dissimilar service switching points, said service control point comprising means for selecting one of said trigger CPRs based on a trigger type of said trigger encountered at said service switching point.

8. A system for managing services within an advanced intelligent network (AIN) communications system, said AIN communications system comprising a service control point, and a two-way communications network interconnecting a plurality of dissimilar service switching points, said two-way communications network selectively establishing communication between at least two of a plurality of geographically dispersed locations coupled to said dissimilar service switching points, said system comprising:

an AIN triggering device, located at one of said plurality of dissimilar service switching points, that is triggered in response to a request from a calling party to establish a communication connection with a service customer;

a query mechanism to send a query to said service control point in response to said trigger encountered at said service switching point; and a feature interaction manager, located at said service control point, adapted to control the operation of services of said service customer in accordance predetermined interaction criteria.

9. The system according to claim 8, said predetermined interaction criteria comprising an operational status of each of said services and a predetermined prioritization of said services.

10. The system according to claim 9, said feature interaction manager comprising means for determining the operational status of each of said services, and means for activating, based on said predetermined prioritization of said services, service logic for executing a service when said service is determined to have an active operational status.

11. The system according to claim 8, said feature interaction manager comprising a plurality of feature interaction graphs, each of said plurality of feature interaction graphs managing said services in accordance with one of a plurality of trigger types encountered at said service switching points.

12. The system according to claim 11, said trigger types comprising a dialed line number (DLN) trigger type, a 10 digit (10D) trigger type, and a terminating attempt trigger (TAT) type.

13. The system according to claim 8, wherein said service control point further comprises a trigger template comprising a plurality of trigger call processing records (CPR) associated with said service customer, each of said trigger CPRs including information regarding services of said service customer.

14. The system according to claim 13, wherein said services information includes the operational status and activation dates of services, and trunking information.

15. The system according to claim 13, wherein each of said trigger CPRs are associated with one of a plurality of trigger types encountered at said dissimilar service switching points, said service control point comprising means for selecting one of said trigger CPRs based on a trigger type of said trigger encountered at said dissimilar service switching point.

16. In a system for managing services within an advanced intelligent communications system, said advanced intelligent communications system comprising a service control point having service logic for each service subscribed to by a service subscriber, and a two-way communications network interconnecting a plurality of dissimilar service switching points, said two-way communications network selectively establishing a communication connection between at least two of a plurality of geographically dispersed locations coupled to said dissimilar service switching points, a method of managing the interaction of customer services comprises:

encountering, at one of said plurality of dissimilar service switching points, a trigger in response to a request from a calling party to establish a communication connection with a service subscriber;

accessing said service control point in response to said trigger encountered at said one service switching point; and managing, at said service control point, the operation of services of said service subscriber based on an operational status of each of said services and a predetermined prioritization of said services.

17. The method according to claim 16, said managing further comprising:

determining the operational status of each of said services; and activating, based on said predetermined prioritization of said services, service logic for executing a service when said service is determined to have an active operational status.

18. The method according to claim 16, wherein said system comprises a feature interaction manager, said feature interaction manager comprising a plurality of feature interaction graphs, each of said plurality of feature interaction graphs operating and managing said services in accordance with one of a plurality of trigger types encountered at said dissimilar service switching points.

19. The method according to claim 18, said trigger types comprising a dialed line number (DLN) trigger type, a 10 digit (10D) trigger type, and a terminating attempt trigger (TAT) type.

20. The method according to claim 16, wherein said service control point further comprises a trigger template including a plurality of trigger call processing records (CPR) associated with said subscriber, each of said trigger CPRs including information regarding services of said subscriber.

21. The method according to claim 20, wherein said subscriber service information includes the operational status and activation dates of services, and trunking information.

22. The method according to claim 20, wherein each of said trigger CPRs are associated with one of a plurality of trigger types encountered at said dissimilar service switching points, said service control pont performing the step of selecting one of said trigger CPRs based on a trigger type of said trigger encountered at said service switching point.

* * * * *

UNITED STATES PATENT AND TRADEMARK OFFICE
CERTIFICATE OF CORRECTION

PATENT NO. : 5,920,618
DATED : July 6, 1999
INVENTOR(S) : H. FLEISCHER, III et al.

It is certified that error appears in the above-identified patent and that said Letters Patent is hereby corrected as shown below:

On the title page, insert item [56]

—4,611,094  9/1986  Asmuth et al.       379/201
  4,611,096  9/1986  Asmuth et al.       379/207
  4,788,718  11/1988  McNabb             379/113
  4,899,373  2/1990  Lee et al.          379/207
  5,247,571  9/1993  Kay et al.          379/207
  5,353,331  10/1994  Emery et al.       379/207x
  5,592,541  1/1997  Fleischer, III et al.  379/211—

On tht title page, insert item [56]

—Bergman, Roger K., and Brewster, John H., "Perspectives on the AIN Architecture," IEEE Communications Magazine, February 1992, pp. 27-32.—

At column 19, line 12 (claim 8, line 19) of the printed patent, after "accordance" insert ---with---.

At column 20, line 51 (claim 22, line 4) of the printed patent, "pont" should be "point."

Signed and Sealed this

Thirty-first Day of October, 2000

Attest:

Q. TODD DICKINSON

*Attesting Officer*  *Director of Patents and Trademarks*